Jan. 20, 1959     G. E. MARTIN     2,869,228

METHOD OF MAKING A COMPOSITE STRUCTURE

Filed Sept. 6, 1955     2 Sheets-Sheet 1

INVENTOR
George E. Martin
his attorneys

Jan. 20, 1959  G. E. MARTIN  2,869,228
METHOD OF MAKING A COMPOSITE STRUCTURE
Filed Sept. 6, 1955  2 Sheets-Sheet 2

INVENTOR
George E. Martin

United States Patent Office 2,869,228
Patented Jan. 20, 1959

2,869,228
METHOD OF MAKING A COMPOSITE STRUCTURE

George E. Martin, Wheeling, W. Va., assignor to Wheeling Steel Corporation, Wheeling, W. Va., a corporation of Delaware Application September 6, 1955, Serial No. 532,603

5 Claims. (Cl. 29—428)

This invention relates to a method of making a composite structure out of die-formed cooperative elements which are overlapped and fastened together.

The invention has especial utility in the making of material handling means components such, for example, as pallets and pallet covers, although the invention is by no means so limited. For purposes of explanation and illustration the invention will be described as practiced in the making of a pallet and a pallet cover.

In my copending application Serial No. 443,050, filed July 13, 1954, are disclosed a pallet and pallet cover which may comprise components of material handling means such as shipping and storage containers. The pallet and cover of my said copending application may be used either with or without a side wall structure, depending on the particular use to which they are being put. The pallet and cover have proved highly successful and are being demanded by industry in various sizes and shapes.

I have devised a method of making a composite structure of selected size and shape out of die-formed cooperative elements at a small fraction of the cost which would be entailed in the making of such a structure using special dies for each size and shape. I have discovered how to use the same dies in making composite structures of different sizes and shapes whereby I effect a very great saving in cost of dies.

I make a composite structure of selected size and shape out of die-formed cooperative elements formed on the same dies for a range of sizes and shapes of the composite structure by forming blanks to size so that when assembled to form the composite structure of selected size and shape the blanks overlap, die-forming the blanks to form elements with cooperative die-formed portions extending to the overlapping parts thereof, overlapping the elements with said cooperative die-formed portions interfitting and fastening together the thus overlapped elements. I preferably weld together the overlapped elements at the overlapping portions thereof. I also desirably apply a strengthening member bridging a joint between overlapped and fastened together elements. The strengthening member is preferably welded to overlapped and welded together elements.

I also provide a method of making a composite structure of selected size and shape out of die-formed cooperative elements formed on the same dies for a range of sizes and shapes of the composite structure comprising forming blanks to size so that when assembled to form the composite structure of selected size and shape the blanks overlap, die-forming the blanks to form elements with cooperative die-formed portions extending to the overlapping parts thereof, overlapping the elements with said cooperative die-formed portions interfitting, fastening together the thus overlapped elements and die-forming a strengthening formation into the assembly thus formed. The strengthening formation desirably bridges a joint in the overlapped and fastened together elements. I prefer to weld together the overlapped elements, to die-form into the overlapped and welded together elements a strengthening formation bridging a joint therein and to weld to the overlapped, welded together and die-formed elements a strengthening member bridging a joint therein. The strengthening member is preferably welded to the overlapped, welded together and die-formed elements at a strengthening formation die-formed into the overlapped and fastened together elements and bridging a joint therein.

In a preferred method of practicing the invention I make a composite structure of selected size and shape out of nine die-formed cooperative elements formed on the same dies for a range of sizes and shapes of the composite structure by forming a center blank, four side blanks and four corner blanks to size so that when assembled to form the composite structure of selected size and shape the blanks overlap, die-form the blanks to form center, side and corner elements with cooperative die-formed portions extending to the overlapping parts thereof, overlap the elements with said cooperative die-formed portions interfitting and fasten together the thus overlapped elements.

In another preferred method of practicing the invention I make a composite structure of selected size and shape out of two die-formed cooperative elements formed on the same dies for a range of sizes and shapes of the composite structure by forming two blanks to size so that when assembled in opposed relationship to form the composite structure of selected size and shape the blanks overlap, die-forming first a portion of each blank and thereafter another portion with the die-formed portions merging to form elements with cooperative die-formed portions extending to the overlapping parts thereof, overlapping the elements with said cooperative die-formed portions interfitting and fastening together the thus overlapped elements.

In certain instances after die-forming the blanks to be used in making my composite structure to form elements with cooperative die-formed portions extending to the overlapping parts thereof I further die-form such portion of one of the blanks to somewhat enlarge the same to provide for interfitting of the corresponding portion of another of the blanks thereinto and thereafter overlap and fasten together the elements with the cooperative die-formed portions interfitting. I also preferably flange the periphery of the composite structure, the flange extending through both single and double thickness portions thereof and considerably enhancing the strength and rigidity of the structure.

A product which may include the product of my present process is claimed in my copending application Serial No. 532,404, filed of even date herewith.

Other details, objects and advantages of the invention will become apparent as the following description of certain present preferred methods of practicing the same and certain composite structures which may be produced thereby proceeds.

In the accompanying drawings I have illustrated certain present preferred methods of practicing the invention and have shown certain composite structures which may be produced thereby in which.

Referring now more particularly to the drawings, I may utilize the same dies for die-forming elements to be assembled in overlapping relationship and fastened together to form composite structures of a range of sizes and shapes. Figures 1–7 illustrate the invention as practiced in the making of pallets and Figures 9–15 illustrate the invention as applied in the making of pallet covers. While the drawings show only the making of a pallet in a single size and the making of a pallet cover in a single size it will be understood from what has been said above and from the description to follow that the pallet and the pallet cover may be made in a range of sizes using the same dies. The blanks are cut to whatever size and shape is required so that after they have been die-formed and assembled in overlapping relationship and fastened together the composite structure, whether it be a pallet, a pallet cover or other composite structure, is of the desired size and shape.

Figure 7:
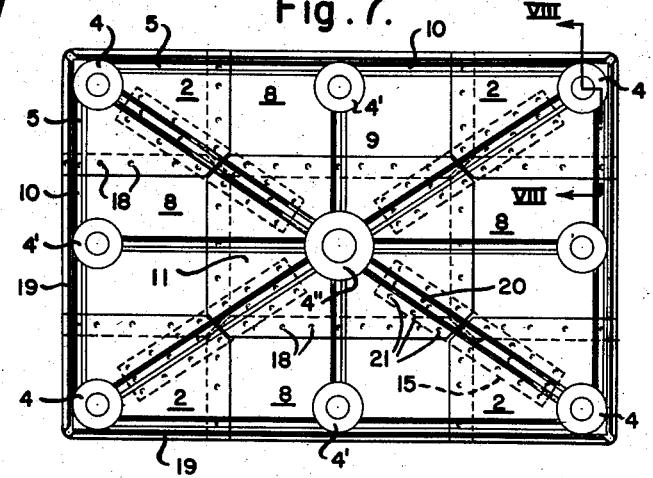
Figure 7 is a plan view of the finished pallet.

In making the composite pallet shown in Figure 7 I provide four corner blanks, four side blanks and one center blank. I die-form the corner blanks in the corner die, the side blanks in the side die and the center blank in the center die. The dies are large enough to die-form the largest blanks which would ever be used so in die-forming blanks of all sizes less than the largest possible size portions of the dies extend beyond the periphery of the blank and the extending portions of the dies do not act on the blank.

Figure 1:
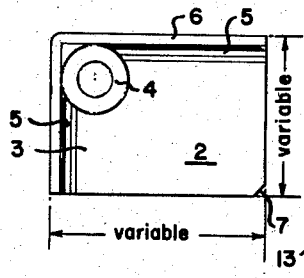
Figure 1 is a face view of a die-formed corner element adapted to be assembled with and fastened to other elements to make a composite structure and specifically in the illustrated form a pallet.
Figure 6:
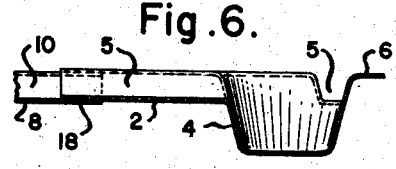
Figure 6 is a fragmentary cross-sectional view taken on the line VI—VI of Figure 5.

The corner die transforms each corner blank into a corner element 2 as shown in Figure 1. The corner element 2 has a flat body portion 3, a deep drawn downwardly extending foot 4 and generally channel shaped die-formed formations 5 intersecting the foot 4 and extending therefrom generally parallel to two of the edges of the element 2 and intersecting the edges remote from the foot extending at right angles to the edges parallel to the channels. Thus each of the channels 5 extends completely to a transverse edge of the element as shown in Figure 1, and that is true no matter what the size of the blank within the capacity of the die since the portions of the die which form the channels 5 are of such length that the channels formed in any blank will intersect the transverse edge remote from the foot 4. The element 2 also has a flat flange 6 outside the foot 4 and channels 5 as shown in Figures 1 and 6. Figure 1 shows that both dimensions of the element 2 are variable and depend upon the size and shape of the pallet to be formed.

Four of the corner elements 2 are required in the manufacture of the pallet, two of those four elements being identical with the element of Figure 1 and the other two being the same except that the blank is placed in the die with its long dimension at right angles to the long dimension of the blank used for forming the element 2. In this way two left-hand corner elements and two right-hand corner elements are formed using identical blanks. The corner of the blank diagonally opposite the foot is cut off as shown at 7 in order to enable the blanks to fit together as will be presently described.

What has been said above regarding the corner element 2 and its formation applies generally to the side element and its formation and to the center element and its formation.

Figure 2:
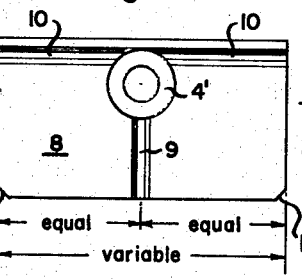
Figure 2 is a face view of a side element.
Figure 5:
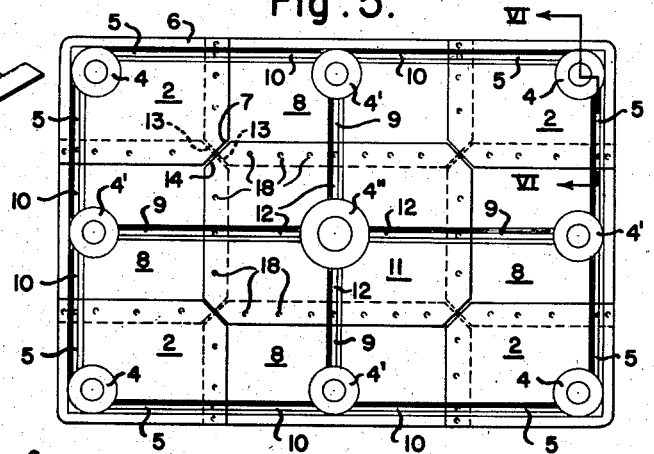
Figure 5 is a plan view of a partially formed pallet made by assembling in overlapping relationship and fastening together one center element, four corner elements and four side elements.

I provide four side elements of the general character of the side element 8 shown in Figure 2. For the making of an oblong pallet two of the side elements 8 will be longer than the other two, this difference being provided for in the length of the blanks which are formed in the side die. The difference in length of the side elements is shown in Figures 5 and 7.

Each side blank is presented to the side die with the midpoint of one of its sides at the center of the die so that the foot 4' is formed with a die-formed channel 9 extending therefrom and generally bisecting the blank and two die-formed channels 10 extending from the foot parallel to the near edge of the blank and of equal length. Whatever the size of the blank presented to the side die the blank is always presented to the die centrally of the blank so that each side element is symmetrical about the channel 9 and foot 4'. The channels 9 and 10 always intersect the transverse edges of the side elements.

Figure 3:
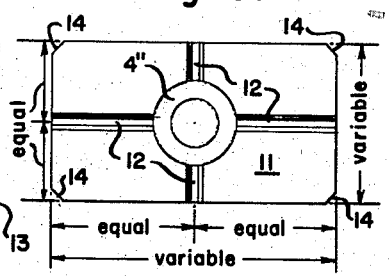
Figure 3 is a face view of a center element.

Only one center element is provided, Figure 3 showing a center element 11 having a centrally formed foot 4'' and four channels 12 radiating therefrom, the channels being parallel to the edges of the element and each midway between the two edges on opposite sides of it. The long dimension of the center element 11 determines the length of the longer side element and the shorter dimension of the center element 11 determines the length of the shorter side element. The two corners of each side element 8 remote from the channels 10 are cut off as shown at 13 and all four corners of the center element 11 are cut off as shown at 14.

The blank for the center element is always presented to the center die in centered relationship so that the channels 12 bisect the element, or, in other words, so that the element is symmetrical about both axes from the center or foot 4''.

Figure 4:
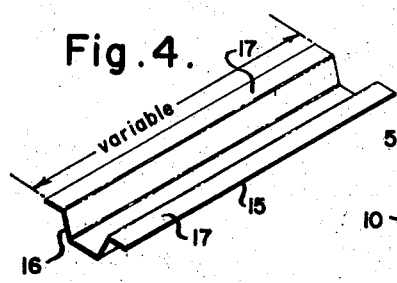
Figure 4 is a perspective view of a strengthening member adapted to be applied to the assembled elements.

Figure 4 is a perspective view of a strengthening member 15 adapted to be utilized in the formation of the pallet as will be presently described. The strengthening member 15 is in the form of a channel 16 flaring outwardly from its bottom and having a flange 17 at each side parallel to the bottom of the channel.

The four corner elements, the four side elements and the single center element are assembled in overlapping relationship as shown in Figure 5. The corner and center elements are disposed in substantially coplanar relationship with their cut off corners in juxtaposition and the side elements are disposed beneath the center and corner elements with their cut off corners in juxtaposition as shown in Figure 5. The thus assembled elements are then fastened together, welding being the preferred method of fastening. Figure 5 shows the nine elements spot-welded to one another at 18 at the overlapping portions of the elements. The welding is made sufficiently strong that the pallet being formed will be adapted for the use for which it is intended.

Figure 8:
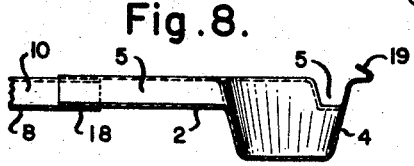
Figure 8 is a fragmentary cross-sectional view taken on the line VIII—VIII of Figure 7.
Figure 9:
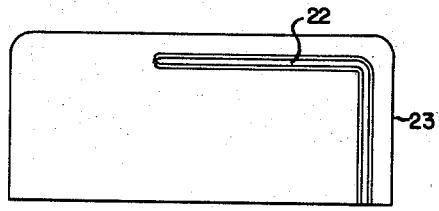
Figure 9 is a face view of one of two like cooperating blanks which has been partially die-formed, the two co-operating blanks after being appropriately die-formed being adapted to be assembled in overlapping relationship and fastened together to form a pallet cover.

After the elements have been assembled in overlapping relationship and welded together as shown in Figure 5 the flange 6 is formed generally upwardly and curled into the form shown in Figures 7 and 8 where the flange is curled upwardly and inwardly and designated by reference numeral 19. The forming of the flange is preferably performed in two die operations at each of the four edges of the pallet. Also, strengthening formations 20 are die-formed into the overlapped and welded together elements, the strengthening formations extending generally diagonally of the pallet and bridging joints between the elements as shown in Figure 7. The strengthening formations 20 are of generally channel form and are preferably of such size and shape as to snugly receive strengthening members such as the member 15 shown in Figure 4. One such strengthening member is preferably applied to each channel 20 and spot-welded to the overlapped and welded together elements by spot-welding 21 as shown in Figure 7.

Thus I provide in a very economical way a pallet generally similar to the pallet of my copending application Serial No. 443,050 but of any selected size and shape within a range of sizes and shapes and utilizing the same dies regardless of the size and shape of pallet selected.

Figure 10:
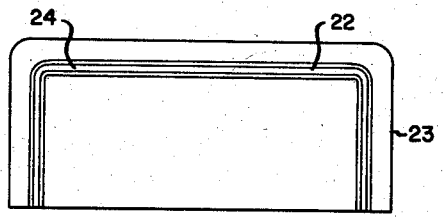
Figure 10 is a face view of the blank shown in Figure 9 after completion of the initial die-forming thereof.
Figure 11:
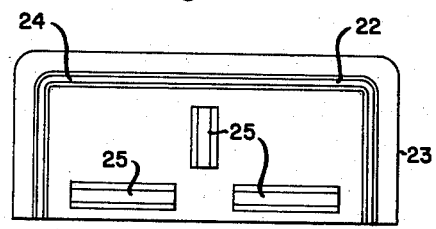
Figure 11 is a face view of the same blank after die-forming strengthening formations into the blank.
Figure 12:
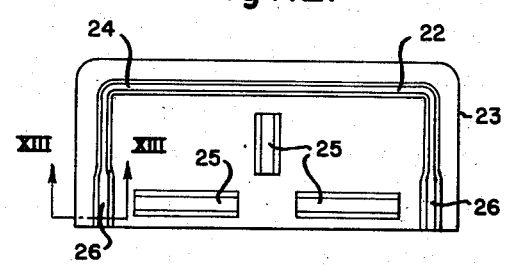
Figure 12 is a face view of the same blank after further die-forming the initially die-formed portion of the blank to somewhat enlarge the same to provide for interfitting of the corresponding portion of another blank thereinto.
Figure 13:
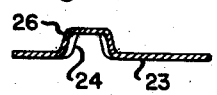
Figure 13 is a fragmentary cross-sectional view taken on the line XIII—XIII of Figure 12.
Figure 14:
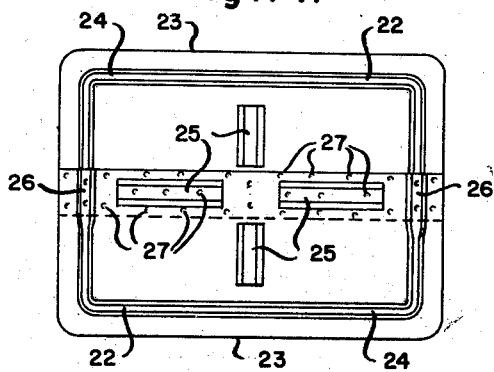
Figure 14 is a plan view of a partially completed pallet cover made by assembling in overlapping relationship and fastening together blanks as shown in Figures 11 and 12.
Figure 15:
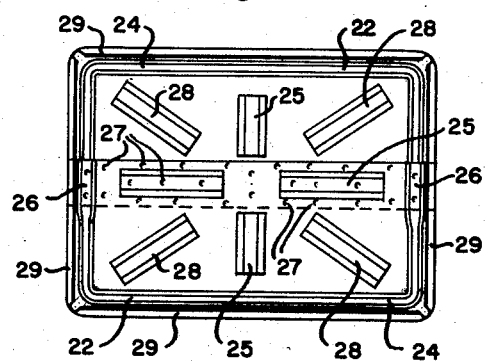
Figure 15 is a plan view of the finished pallet cover.

Figures 9-15 show a making of a pallet cover utilizing the same principle as is employed in making the pallet. The pallet cover is made out of two halves which are almost identical. Each half is cut to shape so that when it is assembled with the other half in overlapping relationship a cover of desired size and shape will be formed. Each cover half is first die-formed to form therein a generally L-shaped channel formation 22 shown as being formed in the right-hand portion of the cover half 23 in Figure 9. The channel formation 22 is formed by a right-hand die which may be used on blanks of various sizes. Thereupon the blank is similarly formed in a left-hand die which forms a generally L-shaped channel 24 merging with the channel 22 as shown in Figure 10. The dies as will be understood will form the L-shaped channels in blanks of various sizes and shapes within the capacity thereof. After the operations of Figures 9 and 10 the cover half 23 has formed therein a U-shaped channel 22—24. It is then subjected to a further die-forming operation to form therein strengthening ribs 25 as shown in Figure 11. Two cover halves 23 as shown in Figure 11 are adapted to be assembled in opposed overlapping relationship to form the cover. The strengthening ribs 25 of the two halves are adapted to interfit. In some cases it may be desirable to somewhat enlarge the extremities of the channels 22 and 24 of one of the cover halves as shown at 26 in Figures 12 and 13 so that when the cover halves are assembled in overlapping relationship the extremities of the channels of one half will fit snugly within the slightly enlarged extremities of the channels of the other half as shown in Figure 14.

The assembled halves as shown in Figure 14 are spot-welded together at the overlapping portions thereof by spotwelds 27 and if desired strengthening members such as the member 15 may also be applied. In completing the cover diagonal strengthening formations 28 are formed therein and the flange 29 is formed analogously to the formation of the pallet as described above as shown in Figure 15.

While I have illustrated certain present preferred methods of practicing the invention and have shown certain composite structures which may be produced thereby it is to be distinctly understood that the invention is not limited thereto but may be otherwise variously practiced within the scope of the following claims.

I claim:
1. A method of making a composite structure of selected size and shape out of two die-formed cooperative elements formed on the same dies for a range of sizes and shapes of the composite structure comprising forming two blanks to size so that when assembled in opposed relationship to form the composite structure of selected size and shape the blanks overlap, die-forming first a portion of each blank and thereafter another portion with the die-formed portions merging to form elements with cooperative die-formed portions extending to the overlapping parts thereof, overlapping the elements with said cooperative die-formed portions interfitting and fastening together the thus overlapped elements.

2. A method of making a composite structure out of selected cooperative elements of a plurality of characteristic shapes of which the elements of at least one of the characteristic shapes are of different sizes comprising forming blanks of plurality of characteristic shapes but of a range of sizes in at least one of the characteristic shapes, die-forming the blanks of each characteristic shape on the same dies albeit such blanks in at least one of the characteristic shapes are of different sizes to form die-formed elements related so that selected elements of the respective characteristic shapes can be assembled in overlapping relationship with die-formed portions thereof interfitting, selecting and thus assembling the elements and fastening together the thus assembled elements.

3. A method of making a composite structure out of selected cooperative elements of a plurality of characteristic shapes of which the elements of at least one of the characteristic shapes are of different sizes comprising forming blanks of a plurality of characteristic shapes but of a range of sizes in at least one of the characteristic shapes, die-forming the blanks of each characteristic shape on the same dies albeit such blanks in at least one of the characteristic shapes are of different sizes to form die-formed elements related so that selected elements of the respective characteristic shapes can be assembled in overlapping relationship with die-formed portions thereof interfitting, selecting and thus assembling the elements, fastening together the thus assembled elements and applying a strengthening member bridging a joint between the overlapped and fastened together elements.

4. A method of making a composite structure out of selected cooperative elements of a plurality of characteristic shapes of which the elements of at least one of the characteristic shapes are of different sizes comprising forming blanks of a plurality of characteristic shapes but of a range of sizes in at least one of the characteristic shapes, die-forming the blanks of each characteristic shape on the same dies albeit such blanks in at least one of the characteristic shapes are of different sizes to form die-formed elements related so that selected elements of the respective characteristic shapes can be assembled in overlapping relationship with die-formed portions thereof interfitting, selecting and thus assembling the elements, fastening together the thus assembled elements and die-forming into the overlapped and fastened together elements a strengthening formation bridging a joint therebetween.

5. A method of making a composite structure out of selected cooperative elements of a plurality of characteristic shapes of which the elements of at least certain of the characteristic shapes are of different sizes comprising forming center blanks, side blanks and corner blanks with at least the side and corner blanks being in a range of sizes, die-forming the center blanks on the same dies, the side dies on the same dies and the corner blanks on the same dies albeit the side and corner blanks are of different sizes to form die-formed center, side and corner elements related so that four selected side elements and four selected corner elements can be assembled in overlapping relationship with a selected center element with die-formed portions of the elements interfitting, selecting and thus assembling the elements and fastening together the thus assembled elements.

References Cited in the file of this patent

UNITED STATES PATENTS

| 1,360,639 | Howe | Nov. 30, 1920 |
| 1,707,655 | Cohn | Apr. 2, 1929 |
| 2,034,183 | Harris | Mar. 17, 1936 |
| 2,114,150 | Rodman | Apr. 12, 1938 |
| 2,285,903 | Clark | June 9, 1942 |
| 2,422,883 | Bruderlin | June 24, 1947 |
| 2,699,912 | Cushman | Jan. 18, 1955 |